Patented Aug. 1, 1944

2,354,824

UNITED STATES PATENT OFFICE 2,354,824

RECEPTACLE FOR CAUSTIC ALKALI

Irving E. Muskat, Akron, Ohio, assignor to Pittsburgh Plate Glass Company, Allegheny County, Pa., a corporation of Pennsylvania No Drawing. Application January 15, 1941, Serial No. 374,602

2 Claims. (Cl. 206—84)

This invention relates to containers for the shipment or storage of aqueous solutions of an alkali metal hydroxide of high concentration. Sodium hydroxide solutions having a concentration of 50 percent and above are very corrosive to metals. Consequently, it is very difficult to avoid corrosion and consequent metallic contamination when such solutions are stored or shipped in metallic containers. The problem is particularly acute when applied to the storage or shipment of solutions of 65 to 80 percent concentration. Solutions of such concentrations are solid at atmospheric temperature and in loading and unloading, it is found necessary to heat such solutions above 150° F., preferably to about 180–220° F. Since caustic solutions are extremely corrosive at these temperatures, it is practically impossible to avoid contamination of the solution during storage or shipment in metal tanks or tank cars.

While numerous paint coatings have been tested, most of these have been found to be unsuitable. Attempts have been made to avoid iron contamination by use of nickel-lined cars but in such a case the nickel pickup is often excessive.

In accordance with my invention, I have found that caustic solutions of high concentration may be stored or shipped without contamination by use of metallic tanks or tank cars, the interior surfaces of which are coated with polystyrene. In general, it is found desirable to condition the polystyrene coating after application by filling the cars with a caustic solution of high concentration, preferably in excess of 45 perceent strength and heating above 150° F. (generally not in excess of 220° F.) for a suitable period of time, preferably in excess of 12 hours. This conditioning treatment toughens the coating.

The polystyrene may be dissolved in various solvents or dispersing media such as benzene, xylene, toluene, ethyl or butyl acetate, cyclohexanone, water, etc., and applied to the metal surface by spraying or brushing. Plasticizers such as alkyl naphthalenes, for example, mono, di, or other poly-amyl -methyl, -ethyl, or -butyl, or benzyl naphthalene or chlorinated diphenyl, etc., may be incorporated into the mixture in order to promote flexibility of the coating. Approximately 10 to 50 percent plasticizer, based upon the weight of polystyrene, may be used. If desired, partially polymerized styrene may be applied to the metal surface and the polymerization completed in situ.

In order to modify the properties of the coating it is often desirable to incorporate other coating compositions. For example, ethers of cellulose such as methyl, ethyl, benzyl or butyl cellulose may be incorporated in the polystyrene. In order to secure compatible polymers it is often desirable to form such coating compositions by polymerizing styrene in the presence of the ethtyl cellulose or similar ether. The amount of ethyl cellulose used in such a case depends largely upon the type of coating composition desired. Small amounts, for example, 10 to 30 percent or more of ethyl cellulose based upon the weight of polystyrene improves the toughness of the polystyrene coating. On the other hand, polystyrene in amounts up to 50 percent based upon ethyl cellulose substantially improves the water resistance of the ethyl cellulose coating. Numerous other agents which contain two or more conjugated polymerizable groups such as butadiene, divinyl benzene, vinyl naphthalene may be incorporated in order to improve the resistance of the coating to heat, water and caustic.

In order to improve the resistance of the coating to the heat and the attack of the caustic solutions, other suitable polymerizable materials may be incorporated. For example, various agents containing two or more polymerizable unsaturated groups which are unconjugated with respect to carbon such as diallyl, dimethallyl, divinyl or dicrotyl phthalate, maleate, fumarate, succinate, adipate, carbonate or allyl, vinyl, crotyl or methallyl acrylate, methacrylate, crotonate, etc. may be introduced into the coating and polymerized in situ. This polymerization may be effected during the curing of the coating by the caustic solution as described. The agents may be incorporated either in the monomeric or partially polymerized form. Particularly effective results may be secured by partially polymerizing a solution of these agents in a suitable solvent such as benzene or xylene to form a viscous solution and thereafter recovering a soluble fusible polymer by addition of a nonsolvent such as methyl or ethyl alcohol. This fusible polymer may then be used in the coating composition. Peroxides such as benzoyl peroxide or other polymerization catalysts may be added in order to assist polymerization.

In order to secure a suitable coating it is generally essential to carefully sandblast the metal surface and to apply several coatings to the surface. The painted surface should then be conditioned by heating the coated surface while exposed to a caustic solution of at least about 30 percent concentration to a temperature of about 150° F.

The following is an example of a suitable composition for use in the present invention.

| | Parts by weight |
|---|---|
| Toluene | 130 |
| Xylene | 260 |
| Benzene | 120 |
| Methyl Cellosolve acetate | 20 |
| Diamyl naphthalene | 15 |
| Polystyrene | 35 |

The films of polystyrene so produced are found to be very resistant to the attack of caustic. Thus, it is possible to ship or store caustic containing less than 0.001 percent of iron or other metallic impurity on the anhydrous basis without increase in the metal content of the solution over this value. In many cases, 73 percent caustic solutions containing 0.0001 to 0.0003 percent iron have been stored for long periods of time in coated iron tanks without material increase in iron content.

Pigments such as mica or titanium dioxide may be incorporated, if desired, in order to improve the resistance of the coating, or to give the desired color.

Although the present invention has been described with reference to the specific details of certain embodiments thereof, it is not intended that such details shall be regarded as limitations upon the scope of the invention except insofar as included in the accompanying claims.

I claim:

1. An article of manufacture comprising a metallic receptacle containing an aqueous solution of an alkali metal hydroxide of at least about 50 percent concentration, the interior surface of said receptacle being covered with a composition comprising a benzene soluble ethyl cellulose and polystyrene.

2. An article of manufacture comprising a metallic receptacle containing an aqueous solution of an alkali metal hydroxide of at least about 50 percent concentration, the interior surface of said receptacle being covered with a composition comprising an alkali resistant ether of cellulose and polystyrene.

IRVING E. MUSKAT.